United States Patent [19]

Nishiura et al.

[11] Patent Number: 4,826,346
[45] Date of Patent: May 2, 1989

[54] CAMSHAFT PREFERABLY FOR AN INTERNAL COMBUSTION ENGINE

[75] Inventors: Norimasa Nishiura, Nagoya; Tadashi Hishida, Sakai, both of Japan

[73] Assignees: Mitsubishi Jukogyo Kabushiki Kaisha, Tokyo; VIV Engineering Inc., Osaka, both of Japan

[21] Appl. No.: 849,733

[22] Filed: Apr. 9, 1986

[30] Foreign Application Priority Data

Apr. 11, 1985 [JP] Japan ............................ 60-52838[U]
Oct. 25, 1985 [JP] Japan ........................... 60-163806[U]

[51] Int. Cl.$^4$ ................................................. F16B 1/00
[52] U.S. Cl. ...................... 403/267; 403/265; 403/357
[58] Field of Search ............... 264/262, 263; 156/84, 156/86; 403/267, 367, 372, 225, 221, 350, 202, 203, 375, 356, 357, 358, 265; 29/447, 460

[56] References Cited

U.S. PATENT DOCUMENTS

| | | | |
|---|---|---|---|
| 743,713 | 11/1903 | Gorman | 403/356 X |
| 1,332,395 | 3/1920 | Hachmann | 403/356 X |
| 1,747,964 | 2/1930 | Wirth | 403/265 |
| 2,027,961 | 1/1936 | Currie | 156/294 X |
| 2,845,696 | 8/1958 | De Bourgues | 29/460 X |
| 3,182,345 | 5/1965 | Smith | 403/375 X |
| 3,211,598 | 10/1965 | O'Brien | 156/86 |
| 3,758,353 | 9/1973 | Huriez | 156/86 X |
| 3,941,495 | 3/1976 | Duncan | 403/268 X |
| 4,172,678 | 10/1979 | Schönwald et al. | 403/357 X |
| 4,233,731 | 11/1980 | Clabburn et al. | 156/86 X |
| 4,237,609 | 12/1980 | Clabburn et al. | 156/86 X |
| 4,492,129 | 1/1985 | Hasegawa | 403/372 X |
| 4,561,799 | 12/1985 | Arena | 403/375 X |

FOREIGN PATENT DOCUMENTS

| | | | |
|---|---|---|---|
| 2421663 | 11/1975 | Fed. Rep. of Germany | 403/220 |
| 595043 | 7/1925 | France | 403/358 |
| 134162 | 7/1933 | German Democratic Rep. | 403/225 |
| 1204879 | 9/1970 | United Kingdom | 403/358 |

Primary Examiner—Randolph A. Reese
Assistant Examiner—Anthony Knight
Attorney, Agent, or Firm—Birch, Stewart, Kolasch, & Birch

[57] ABSTRACT

A camshaft for an internal combustion engine comprising a metal cam, a shaft inserted into a through hole formed in the cam and resin poured between the cam and the shaft to join them. The cam is formed with plural grooves which are formed in the inner periphery of the hole in parallel with the shaft and into which the resin is poured. The groove is formed fanwise so that a sectional shape of the groove is wider as it approaches the outer periphery of the cam. Thus, when the resin which is filled into the grooves at high temperature is cooled naturally and contracts, since the resin bites the cam, gap and failure of contact are not produced between the cam receiving rotational force and the resin when the camshaft is operated for the internal combustion engine.

20 Claims, 2 Drawing Sheets

CAMSHAFT PREFERABLY FOR AN INTERNAL COMBUSTION ENGINE

BACKGROUND OF THE INVENTION (i) Field of the Invention

The present invention relates to a camshaft of an internal combustion engine.

(ii) Prior Art Statement

FIGS. 9 and 10 illustrate an example of a prior art camshaft of an internal combustion engine which is structured so that a metal cam 2 and a shaft 1 are fixedly joined to each other by resin 3. FIG. 10 is a sectional view taken along line X—X of FIG. 9. In both figures, the cam 2 and the shaft 1 are joined through the resin 3, and the relative displacement of the cam 2 and the resin 3 in the axial direction and the rotational direction is limited by a cam-like flange a. Further, the resin 3 is poured around the shaft 1 and into a groove b so that the relative displacement of the shaft 1 and the resin 3 in the axial direction and the rotational direction is limited and the shaft 1 and the cam 2 are fixed to each other through the resin 3.

However, in such a prior art camshaft, since heated resin 3 is poured between the shaft 1 and the cam 2 when the camshaft is manufactured, the resin 3 contracts when the resin 3 is cooled naturally. Consequently, a gap is produced between the outer periphery of the flange a formed of the resin and the cam 1. The contact surfaces of the resin 3 and the cam 2 are worn away due to variation of timing of the cam or knocking in rotation. Further, when the cam is small, i.e. the size of the flange a shown in FIG. 10, a capacity of resin is decreased and a desired torque between the cam 2 and the resin 3 cannot be obtained.

SUMMARY OF THE INVENTION

The present invention has been made in order to solve the above problems in the prior art, and an object of the present invention is to provide a camshaft of an internal combustion engine in which a gap is not produced at the contract surface in the rotation direction of the cam between the cam and resin even when the resin poured between the cam and a shaft is cooled and contracts.

Another object of the present invention is to provide a camshaft of an internal combustion engine possessing the capability of desired torque or strength even if a cam is small.

In order to achieve the above objects, the structure of the present invention is as follows.

(I) The camshaft of the internal combustion engine including a metal cam and a shaft which are joined to each other through resin is characterized in that plural grooves disposed in parallel to the axis of the shaft for pouring the resin are provided in the inner periphery of a through hole of the cam through which the shaft is penetrated and the grooves are formed fanwise so that the sectional shape of the groove is wider as it approaches the outer periphery of the cam. The resin at high temperature is poured into the grooves.

(II) The cam shaft of the internal combustion engine including a metal cam and a shaft which are joined to each other through resin is characterized in that plural grooves disposed in parallel to the axis of the shaft for pouring the resin are provided in the inner periphery of a through hole of the cam through which the shaft is penetrated and the grooves are formed fanwise so that the sectional shape of the groove is wider as it approaches the outer periphery of the cam. Furthermore, the shaft is formed with a circumferential groove at a position where the cam overlaps the shaft. The resin at high temperature is poured into both the grooves.

With such a structure, since the resin contracts toward the center of the camshaft when cooled, even if overall resin in the groove contracts, the resin bites the cam on the surface in the rotational direction in a fan-like groove having a width in the inner peripheral direction which is gradually narrow. Accordingly, gap and failure of contact are not produced, and further play and unusual wearing are not produced.

Even if the cam is smaller, desired torque between the cam and the resin can be obtained by forming the circumferential groove in the shaft in addition to the fan-like groove.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3 and 4 are cross-sectional views taken along line III—III of FIG. 1, in which FIG. 3 is an enlarged cross-sectional view before resin contracts and FIG. 4 is an enlarged cross-sectional view after resin has contracted;

FIGS. 7 and 8 are cross-sectional views taken along line VII—VII of FIG. 5, in which FIG. 7 is an enlarged cross-sectional view before resin contracts and FIG. 8 is an enlarged cross-sectional view after resin has contracted;

DETAILED DESCRIPTION OF PREFERRED EMBODIMENTS

First and second embodiments are now successively described with reference to attached drawings.

[First Embodiment]

The first embodiment of the present invention is described with reference to FIGS. 1 to 4.

Figure 1:
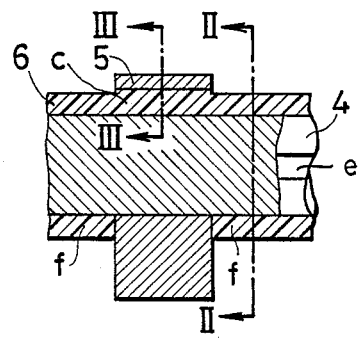
FIG. 1 is a longitudinal sectional view of a first embodiment according to the present invention.
Figure 2:
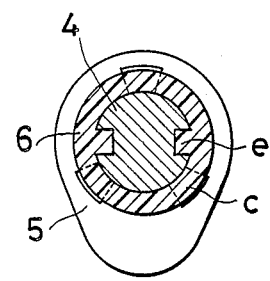
FIG. 2 is a cross-sectional view taken along line II—II of FIG. 1.
Figure 3:
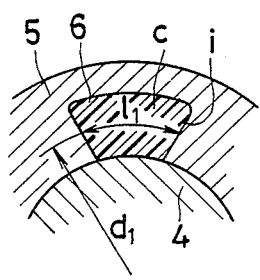
Figure 4:
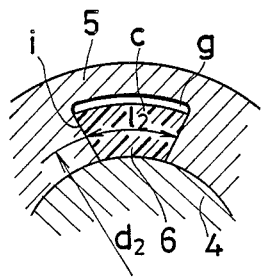
Figure 9:
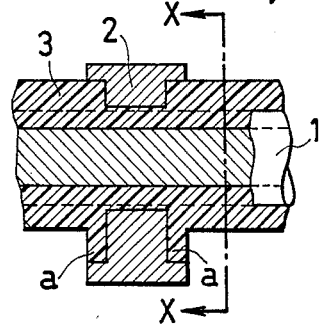
FIG. 9 is a longitudinal sectional view of a prior art camshaft.
Figure 10:
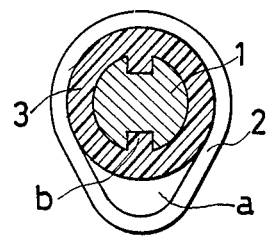
FIG. 10 is a cross-sectional view taken along line X—X of FIG. 9.

FIG. 1 is a longitudinal sectional view of a camshaft according to the first embodiment. FIG. 2 is a cross-sectional view taken along line II—II of FIG. 1. FIGS. 3 and 4 are cross-sectional views taken along line III—III of FIG. 1, in which FIG. 3 is an enlarged crosssectional view before resin 6 contracts and FIG. 4 is an enlarged cross-sectional view after the resin 6 has contracted.

Referring to FIGS. 1 and 2, the camshaft comprises a cam 5, a shaft 4 and the resin 6, and the cam 5 is fixedly joined with the resin 6 in the rotational direction and the axial direction by means of fan-like grooves c and resin filling portions f at either side of the cam. The resin 6 is poured around the shaft 4 and in the grooves e so that the relative displacement of the shaft 4 and the resin 6 in the axial direction and the rotational direction is limited. Consequently, the shaft 4 and the cam 5 are fixedly joined to each other through the resin 6.

Operation of the embodiment is now described.

The cam 5 is secured with the heated resin 6 and the resin 6 contracts when it naturally cools.

When the heated resin 6 which is poured into the fan-like grooves c having a diameter $d_1$ of a center pitch circle and a length $l_1$ of a circular arc as shown in FIG. 3 is cooled, the resin 6 contracts and the diameter of the center pitch circle and the length of the circular arc are reduced to $d_2$ and $l_2$, respectively, as shown in FIG. 4.

The contraction of the resin due to cooling produces a gap g between the outer periphery of the fan-like grooves and the inner periphery of the cam 5. With regard to planes i of the fan-like groove normal to the rotational direction, since the diameter $d_2$ of the pitch circle and the length $l_2$ of the circular arc of the groove after contraction can be established by multiplying a length of the resin in the planes before contraction by a contraction factor, the angle of the groove is determined and the groove can be formed so that no gap is produced.

Since the resin 6 contracts in the circumferential direction, a gap is not produced between the groove e of the shaft 4 and the resin 6.

As described above, the camshaft of the internal combustion engine according to the present invention utilizes the resin to fixedly join the cam and the shaft. Since the hole formed in the cam is formed at its outer periphery with the particular fan-like grooves which are formed large at the outer periphery thereof and small at the inner periphery thereof, the resin bites the surface in the rotational direction of the cam when the resin poured between the cam and the shaft at high temperature is cooled naturally and contracts. Accordingly, when a fuel pump and a tappet for intake and exhaust not shown are operated by the cam, since rotational force is exerted on the contact surface between the cam and the resin, variation of the timing of the cam and wearing of the resin can be prevented by the structure of the camshaft in which gap and failure of contact are not produced in the surface on which the rotational force is exerted.

[Second Embodiment]

Referring to FIGS. 5 to 8, a second embodiment of the present invention is now described.

Figure 5:
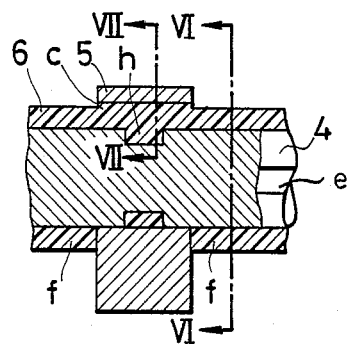
FIG. 5 is a longitudinal sectional view of a second embodiment according to the present invention.
Figure 6:
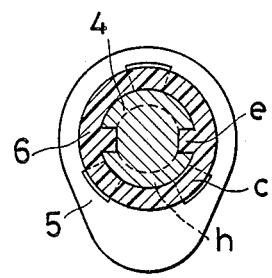
FIG. 6 is a cross-sectional view taken along line VI—VI of FIG. 5.
Figure 7:
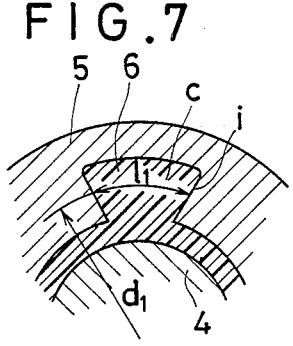
Figure 8:
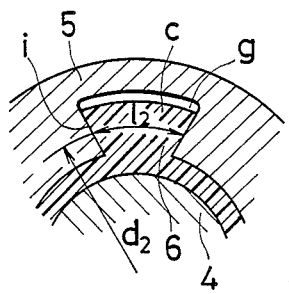

FIG. 5 is a longitudinal sectional view of a camshaft according to the second embodiment. FIG. 6 is a cross-sectional view taken along line VI—VI of FIG. 5. FIGS. 7 and 8 are both cross-sectional views taken along line VII—VII of FIG. 5, in which FIG. 7 is an enlarged cross-sectional view before contraction of the resin 6 and FIG. 8 is an enlarged cross-sectional view after contraction of the resin 6.

Referring to FIGS. 5 and 6, the camshaft comprises a cam 5, a shaft 4 and resin 6. A circumferential groove h is formed in the outer periphery of the shaft 4 at a position where the cam 5 overlaps the shaft 4. Thus, the movement of the cam 5 in the rotational direction and the axial direction is limited by the fan-like grooves c, the circumferential groove h of the shaft 4 and the resin filling portions f at both sides of the cam 5 so that the cam 5 is fixedly joined to the shaft 4 through the resin. Further, the resin 6 is poured around the shaft 4 and in a groove e and the circumferential groove h, so that the relative displacement of the shaft 4 in the axial direction and the rotational direction is limited by the resin 6. Accordingly, the shaft 4 and the cam 5 are strongly fixed to each other through the resin.

Operation of the present embodiment is now described.

The cam 5 and the shaft 4 are fixed and joined by heated resin 6, and when the heated resin 6 is cooled naturally, the resin 6 contracts.

When the heated resin 6 poured into the fan-like grooves c having a diameter $d_1$ of a center pitch circle and a length $l_1$ of a circular arc as shown in FIG. 7 is cooled and contracts, only the resin 6 contracts as shown in FIG. 8 and the diameter of the center pitch circle and the length of the circular arc are $d_2$ and $l_2$, respectively. The contraction of the resin due to cooling produces a gap g between the outer periphery of the fan-like groove c and the inner periphery of the cam 5. With regard to planes i of the fan-like groove c normal to the rotational direction, since the diameter $d_2$ of the pitch circle and the length $l_2$ of the circular arc of the groove after contraction can be established by multiplying a length of the resin in the planes before contraction by a contraction factor, the angle of the groove is determined and the groove can be formed so that no gap is produced.

Further, since the resin 6 contracts in the circumferential direction, no gap is produced between the groove e and the circumferential groove h and the resin 6.

As described above, the camshaft of the internal combustion engine according to the present invention uses the resin for fixedly joining the cam and the shaft, and the hole formed in the cam is formed at its outer periphery with the particular fan-like grooves which are formed large at the outer periphery thereof and small at the inner periphery thereof. Therefore, the resin bites the surface in the rotational direction of the cam when the resin poured between the cam and the shaft at high temperature is cooled naturally and contracts. Accordingly, when a fuel pump and a tappet for intake and exhaust not shown are operated through the cam, rotational force is exerted on the contact surface between the cam and the resin. However, variation of the timing of the cam and wearing of the resin can be prevented by the structure of the camshaft in which gap and failure of contact are not produced in the surface on which the rotational force is exerted. Since the circumferential groove is formed in the position where the cam overlaps the shaft, desired torque corresponding to the size of the cam can be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A camshaft comprising:

a shaft, said shaft having at least one groove provided at an outer surface thereof;

a cam having an opening in which a shaft portion of said shaft is disposed, said cam having at least one fan-shaped groove at said opening, said fan-shaped groove having two side walls and an end wall, said two walls diverging outwardly from said opening at a predetermined angle, said at least one fan-shaped groove being non-adjacent said at least one groove of said shaft; and resin disposed between said shaft and said cam and in said groove for mechanically connecting said cam to said shaft and for preventing relative movement between said can and said shaft, said resin filling said fan-shaped groove and said at least one groove of said shaft, said resin initially contacting said two side walls and said end wall of said fan-shaped groove whereafter said resin contracts to form a gap between said end wall and said resin, said predetermined angle of said groove being selected and positioned for causing said resin to remain in contact with at least a majority of said two side walls after said resin contracts and said gap is formed, said resin which thereafter remains in contact with said two side walls being in continuous contact therewith, said predetermined angle therefore ensuring said cam and said shaft remain in mechanical connection even after said resin contracts and said gap is formed.

2. The camshaft according to claim 1, wherein at least a portion of an outer surface of said shaft portion tightly engages with at least a portion of said surface of said opening for rigidly mounting said cam to said shaft.

3. The camshaft according to claim 1, wherein said at least one groove of said shaft extends along the length of said shaft for preventing relative movement between said cam and said shaft in a rotational direction of the camshaft.

4. The camshaft according to claim 2, wherein said at least one fan-shaped groove in said cam extends in a direction along the length of the camshaft.

5. The camshaft according to claim 2, wherein a layer of resin is disposed at the outer surface of a portion of said shaft adjacent to said shaft portion on which said cam is mounted, said layer of resin being continuous with said resin disposed between said cam and said shaft.

6. The camshaft according to claim 3, wherein said at least one fan-shaped groove in said cam extends in a direction along the length of the camshaft.

7. The camshaft according to claim 3, wherein a layer of resin is disposed at the outer surface of a portion of said shaft adjacent to said shaft portion on which said cam is mounted, said layer of resin being continuous with said resin disposed between said cam and said shaft.

8. The camshaft according to claim 1, wherein said at least one groove in said shaft extends along the circumferential direction of said shaft for preventing relative movement between said cam and said shaft in a direction along the length of the camshaft.

9. The camshaft according to claim 8, wherein said at least one fan-shaped groove in said cam extends in a direction along the length of the camshaft.

10. The camshaft according to claim 8, wherein a layer of resin is disposed at the outer surface of a portion of said shaft adjacent to said shaft portion on which said cam is mounted, said layer of resin being continuous with said resin disposed between said cam and said shaft.

11. The camshaft according to claim 3, wherein at least two grooves are provided in said shaft, said at least two grooves extending along the circumferential direction of said shaft and at least one of said at least two grooves preventing relative movement between said cam and said shaft in a direction along the length of the camshaft.

12. The camshaft according to claim 1, wherein said at least one fan-shaped groove in said cam extends in a direction along the length of the camshaft.

13. The camshaft according to claim 12, wherein said at least one fan-shaped groove in said cam extends in a direction parallel to a longitudinal axis of the camshaft.

14. The camshaft according to claim 12, wherein a layer of resin is disposed at the outer surface of a portion of said shaft adjacent to said shaft portion on which said cam is mounted, said layer of resin being continuous with said resin disposed between said cam and said shaft.

15. The camshaft according to claim 12, wherein said shaft and said cam are made of metal.

16. The camshaft according to claim 1, wherein a layer of resin is disposed at the outer surface of a portion of said shaft adjacent to said shaft portion on which said cam is mounted, said layer of resin being continuous with said resin disposed between said cam and said shaft.

17. The camshaft according to claim 16, wherein said shaft and said cam are made of metal.

18. The camshaft according to claim 1, wherein said shaft and said cam are made of metal.

19. A camshaft of an internal combustion engine comprising:

a metal cam having a plurality of fan-shaped grooves, each of said fan-shaped grooves diverging outwardly from a central portion of said cam at a predetermined angle, each of said grooves having at least two side walls and an end wall and receiving resin therein, said resin initially filling each of said grooves for causing contact of said resin with said at least two side walls and said end wall whereafter said resin contracts to form a gap between said end wall and said resin, said predetermined angles of each of said grooves being selected and positioned for causing said resin to remain in contact with at least a majority of said two side walls after said resin contracts and said gap is formed, said resin which thereafter remains in contact with said two side walls of each of said grooves being in continuous contact therewith; and a shaft joined to said resin, said predetermined angle of each of said grooves of said cam ensuring said shaft and said cam remain in contact even after said resin contracts within said grooves of said cam, said shaft being formed with a plurality of grooves which are generally parallel with an axis thereof and being filled with said resin, each of said plurality of grooves in said shaft being non-adjacent with each of said fan-shaped grooves.

20. A camshaft of an internal combustion engine comprising:

a metal cam having a plurality of fan-shaped grooves which are generally parallel to a longitudinal axis of said cam, each of said fan-shaped grooves diverging outwardly with respect to longitudinal axis at a predetermined angle, each of said grooves having at least two side walls and an end wall and receiving resin therein, said resin initially filling each of said grooves for causing contact of said resin with said at least two side walls and said end wall whereafter said resin contracts to form a gap between said end wall and said resin, said predetermined angles of each of said grooves being selected and positioned for causing said resin to remain in contact with at least a majority of said two side walls after said resin contracts and said gap is formed, said resin which thereafter remains in contact with said two side walls of each of said grooves being in continuous contact therewith; and a shaft joined to said cam through said resin, said predetermined angle of each of said grooves of said cam ensuring said shaft and said cam remain joined even after said resin contracts within said grooves of said cam, said shaft being formed with a plurality of grooves which are generally parallel with a longitudinal axis thereof and being filled with said resin, said longitudinal axis of said cam being generally coextensive with said longitudinal axis of said shaft, each of said plurality of grooves in said shaft being non-adjacent with each of said fan-shaped grooves.

* * * * *